United States Patent [19]

LeMaster

[11] Patent Number: 5,339,560
[45] Date of Patent: Aug. 23, 1994

[54] FISHING LURE

[75] Inventor: William H. LeMaster, Clearwater, Fla.

[73] Assignee: L & S Bait Company of Florida, Incorporated, Largo, Fla.

[21] Appl. No.: 973,641

[22] Filed: Nov. 9, 1992

[51] Int. Cl.⁵ .................................................. A01K 85/00
[52] U.S. Cl. .................................. 43/42.44; 43/42.45; 43/42.42
[58] Field of Search .................. 43/42.42, 42.4, 42.45, 43/42.44, 42.41

[56] References Cited

U.S. PATENT DOCUMENTS

| 1,239,957 | 9/1917 | Phinney et al. | 43/42.42 |
| 1,320,570 | 11/1919 | Reynolds | 43/42.41 |
| 1,773,561 | 8/1930 | Wethall | 43/42.4 |
| 1,986,991 | 1/1935 | Wilson | 43/42.45 |
| 1,992,766 | 2/1935 | Pflueger | 43/42.4 |
| 2,621,439 | 12/1952 | Leidel | 43/42.42 |
| 2,738,612 | 3/1956 | French | 43/42.42 |
| 3,034,249 | 5/1962 | Hawks | 43/42.44 |
| 4,922,647 | 5/1990 | Tompkins | 43/42.45 |

Primary Examiner—Kurt C. Rowan
Attorney, Agent, or Firm—Emch, Schaffer, Schaub & Porcello Co.

[57] ABSTRACT

An improved fishing lure is the subject of the invention. The lure includes a lure body and a single fishing hook connected to the body at the bottom of the lure and at the rear end of the lure. A toggle member limits side to side motion of the single fishing hook while maintaining the hook generally parallel to the lure body.

9 Claims, 2 Drawing Sheets

FISHING LURE

BACKGROUND OF THE INVENTION

The present invention relates to an improved fishing lure. It is known that fish are attracted to lures, at least in part by the motion of the lure as it travels through the water.

Many current lures include one or more treble hooks. Lures having treble hooks have several problems. One problem is that the treble hooks have a tendency to be entangled in weeds or underwater wood.

Another problem is that treble hooks are more difficult to disengage when releasing a fish. Many sport fishermen do not keep their catch. Rather, they attempt to release the fish with as little injury to the fish as possible.

The present invention is directed to an improved fishing lure which has a single fishing hook. The improved lure provides from the desired lure movement through the water and at the same time provides a lure which is easily disengaged to release a fish.

SUMMARY OF THE INVENTION

The improved lure of the present invention includes a lure body and a single fishing hook having an eye end, a shank and a point end. The eye end of the single fishing hook is pivotally connected to the bottom of the lure body. A toggle member is mounted at the rear of the lure body and includes means at its lower end for receiving the shank of the single fishing hook adjacent the point end.

The single fishing hook is mounted in a position generally parallel to the bottom of the lure body.

The toggle connection between the rear end of the lure body and the single fishing hook limits the side travel of the hook but allows sufficient travel to provide the desired relative motion between the hook and the lure body to impart the overall desired lure motion in the water.

DESCRIPTION OF THE PREFERRED EMBODIMENTS

Figure 1:
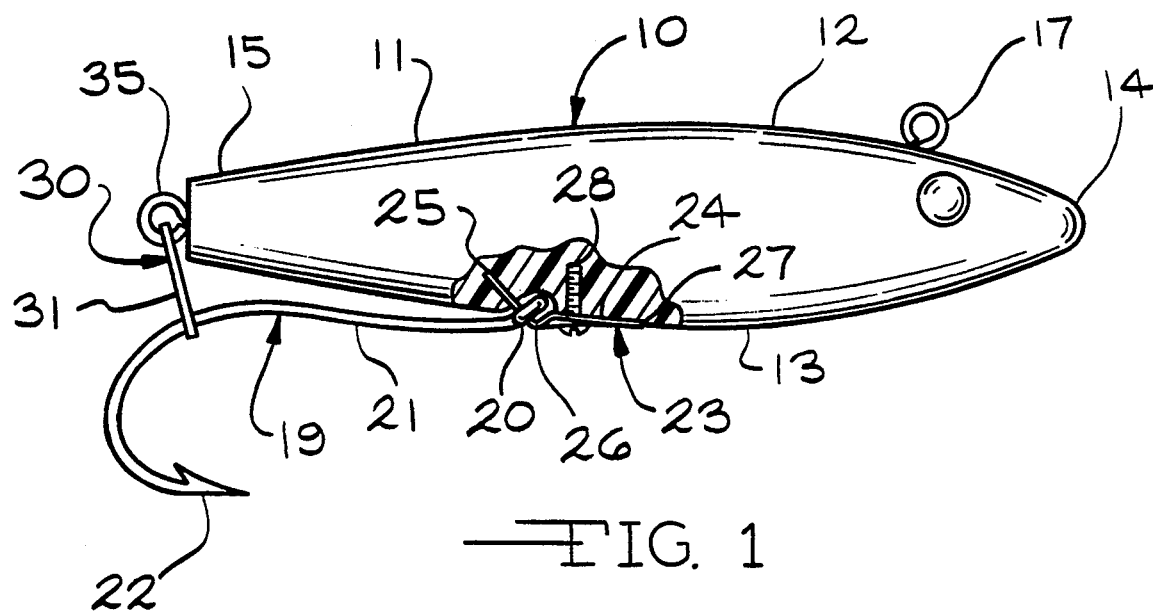
FIG. 1 is a side elevational view of an improved fishing lure according to the present invention with a portion of the lure shown in section.
Figure 2:
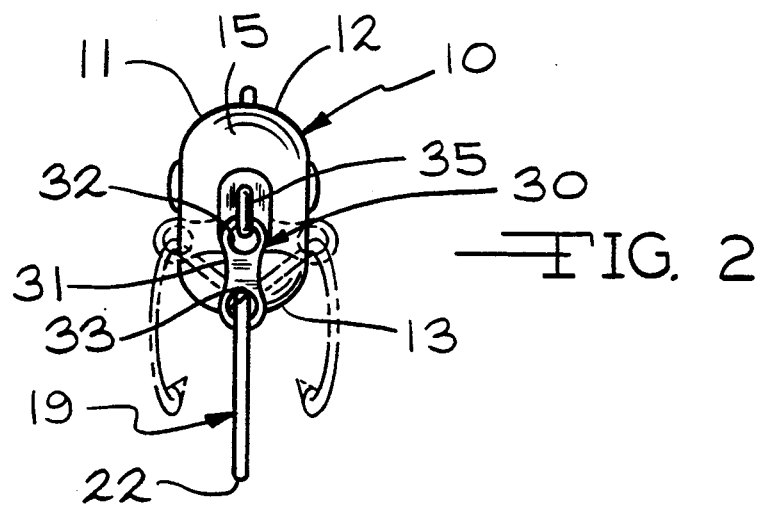
FIG. 2 is a rear view of the fishing lure shown in FIG. 1 and indicating by dashed lines the limits of side travel of the hook relative to the lure body.
Figure 3:
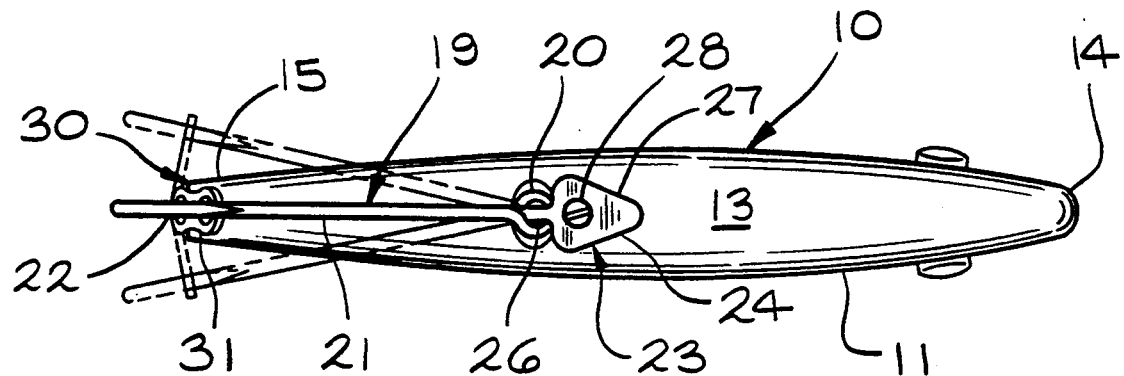
FIG. 3 is a bottom view of the fishing lure shown in FIG. 1, again showing by dashed lines the limits of side travel of the hook relative to the lure body.

Referring to FIGS. 1-3, an improved fishing lure, according to the present invention is generally indicated by the reference number 10. The fishing lure 10 includes a body 11 having a top 12, a bottom 13, a front end 14 and a rear end 15. The body 10 can be of different configurations and constructed of different materials. For examples, while the body 10 in the present embodiment is constructed of a plastic material, other embodiments may be constructed of wood or metal.

In the present embodiment, a screw eye 17 is mounted on the top of the body 11 relatively close to the front end 14. The screw eye 17 is used to connect a fishing line (not shown) to the fishing lure 10.

A single fishing hook 19 is connected to the lure body 11 near the center of the bottom 13. The fishing hook 19 includes an eye 20 at one end, a shank 21, and a point 22 at the other end.

In the present embodiment, the single fishing hook 19 has its eye 20 pivotally connected to the body 11 at a point on the bottom 11 which is a short distance past the midpoint closer to the rear end 15. The hook 19 is positioned generally parallel to the lure body 11.

Connector means 23 are attached to the lure bottom 13 between the front end 14 and the rear end 15. In the present embodiment, the connector means 23 comprises a connector plate 24 having a first end 25, a loop portion 26 and a second end 27. The first end 25 is received and positioned within the body 11 and the second end 27 is connected to the body 11 by a screw 28. The loop portion 26 pivotally engages and mounts the eye 20 of the hook 19.

A toggle means 30 is mounted between the rear end 15 of the body 11 and the single fishing hook 19. The toggle means 30 includes a longitudinally extending toggle plate 31 having an upper hole 32 and a lower hole 33. The toggle plate 31 is connected between the rear end 15 of the lure body 11 and the single fishing hook 19. A screw eye 35 is mounted adjacent the rear end 15 of the body 11 and is connected to the upper hole 32 of the toggle plate 31. The lower hole 33 of the toggle plate 31 receives the shank 21 of the single fishing hook 19 at a location closer to the point end, as shown in FIG. 1.

The toggle means 30 allows the hook 19 to pivot but the longitudinally extending toggle plate 31 limits the side travel of the hook 19 as shown by the opposed dashed line positions in FIGS. 2 and 3.

The toggle mechanism 30 provides the fishing lure 10 with a desired motion as it travels through the water.

Figure 4:
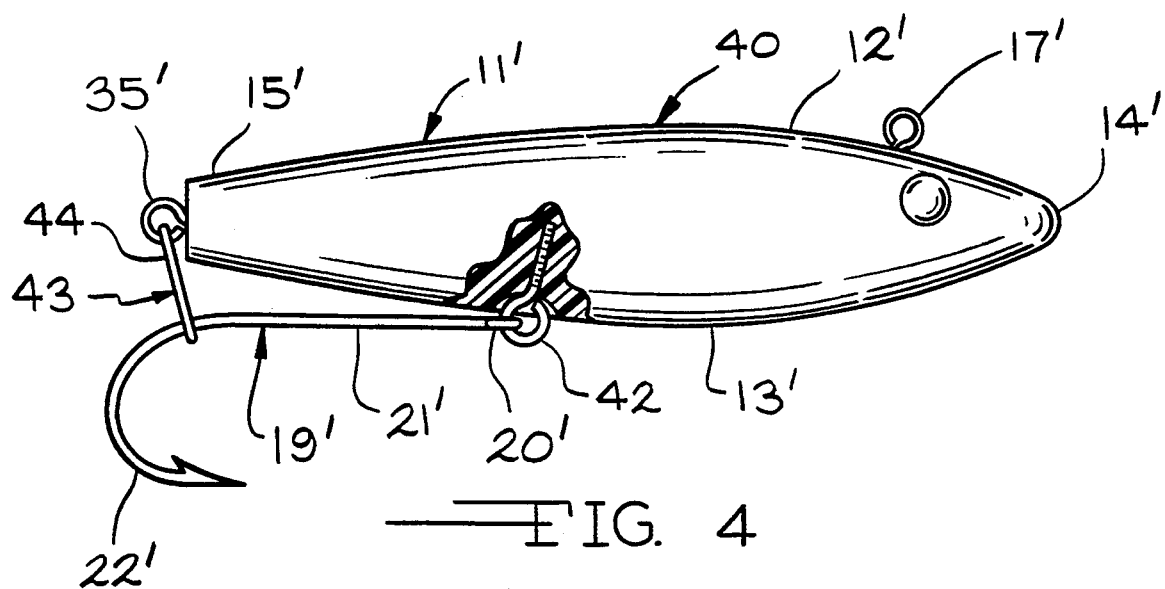
FIG. 4 is a side elevation view of another embodiment of an improved fishing lure according to the present invention with a portion of the lure shown in section.
Figure 5:
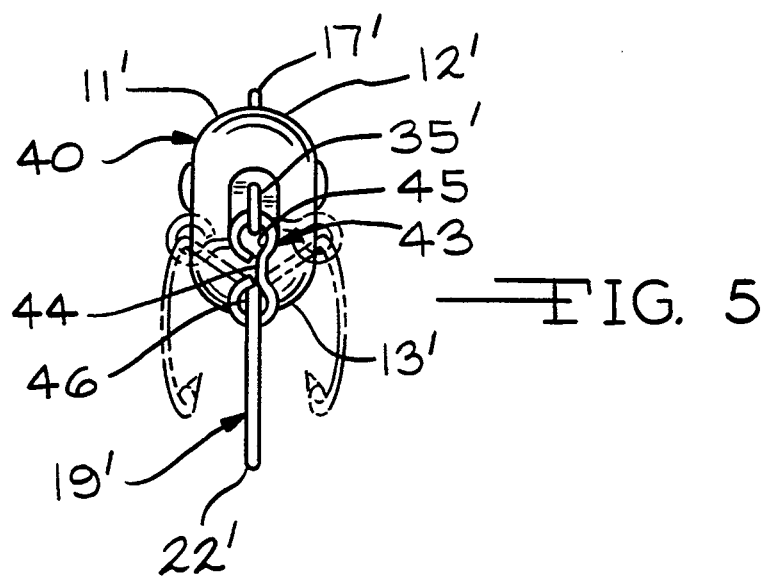
FIG. 5 is a rear view of the fishing lure shown in FIG. 4 and indicating by dashed lines the limits of side travel of the hook relative to the lure body; and, FIG. 6 is a bottom view of the fishing lure shown in FIG. 4, again showing by dashed lines the limits of side travel of the hook relative to the lure body.
Figure 6:
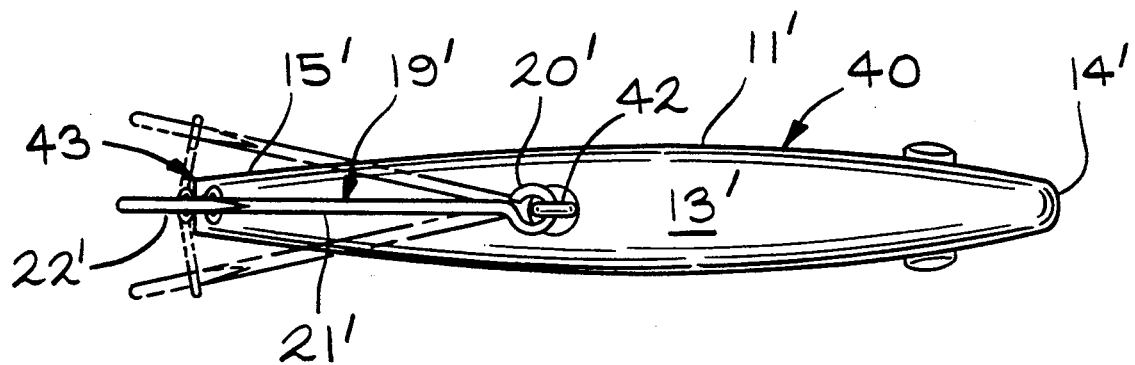

Another embodiment of an improved fishing lure, according to the invention, is generally indicated by the reference number 40 in FIGS. 4-6.

In this embodiment, connector means 41 is attached to the fishing lure bottom 13' between the front end 14' and the rear end 15' for mounting the eye 20' of the single fishing hook 19'.

The connector means 41 comprises a screw eye 42 which engages the hook eye 20'. The single fishing hook 19 is pivotable relative to the screw eye 42.

Toggle means 43 are mounted between the rear end 15' of the lure 40 and the single fishing hook 19', whereby the hook 19' pivots at the rear end 15' and the toggle means 43 limits the movement of the point 22' of the hook 19' while maintaining the single fishing hook 19' in its generally parallel position relative to the body 11'. The toggle means 43 includes a longitudinally extending double loop member 44 connected between the rear end 15' and the hook 19'. The double loop member 44 defines an upper loop 45 and a lower loop 46. The screw eye 35' located at the rear end 15' of the fishing lure 40 is connected to the upper loop 45. The lower loop 46 receives the shank 21' of the single fishing hook 19' adjacent the point end 22'.

Referring to FIGS. 5 and 6, the limits of the travel of the hook 19' as it moves from side to side is indicated by dashed lines.

The body of the fishing lure 40 is constructed of a plastic material, but can also be constructed from other materials.

Revisions to the above described embodiments may be made without departing from the invention and the scope of the following claims.

I claim:

1. A fishing lure comprising, in combination, a body having a top, a bottom, a front end and a rear end and a single fishing hook connected to said body at said bottom and at said rear end, wherein said hook is positioned generally parallel to said body, said single fishing hook comprising a shank, an eye at one end and a point at the other end, connector means attached to said fishing lure bottom between said front end and said rear end for pivotally mounting said eye of said single fishing hook, and toggle means comprising a toggle plate pivotally connected to said rear end of said body and said hook, whereby said single fishing hook can swing from side to side at said rear end and said toggle means limits the sideward movement of said point of said single fishing hook while maintaining said single fishing hook in its generally parallel position relative to said body.

2. A fishing lure according to claim 1, wherein said toggle means comprises a double loop member connected between said rear end of said fishing lure and said single fishing hook.

3. A fishing lure according to claim 2, wherein a screw eye is mounted adjacent said rear end of said body, said double loop member defining an upper loop and a lower loop, said screw eye being connected to said upper loop and said lower loop receiving said shank of said single fishing hook adjacent the point end.

4. A fishing lure according to claim 1, wherein said toggle means comprises a toggle plate having an upper hole and a lower hole, said toggle plate being connected between said rear end of said single fishing hook.

5. A fishing lure according to claim 4, wherein a screw eye is mounted adjacent said rear end of said body, said screw eye being connected to said upper hole of said toggle plate, said lower hole of said toggle plate receiving said shank of said single fishing hook adjacent the point end.

6. A fishing lure according to claim 1, wherein said connector means comprises a screw eye attached to said fishing lure bottom, said screw eye pivotally mounting said eye of said single fishing hook.

7. A fishing lure according to claim 1, wherein said connector means comprises a connector plate attached to said body, said connector plate including a loop portion for engaging said eye of said single fishing hook.

8. A fishing lure comprising, in combination, a body having a top, a bottom, a front end and a rear end and a single fishing hook pivotally connected to said body at said bottom between said front end and said rear end, said single fishing hook including an eye end, a shank and a point end, connector means attached to said bottom for engaging said eye end, and toggle means extending between said rear end of said body and said single fishing hook, said toggle means comprising a toggle plate pivotally connected to said rear end of said body and said shank of said single fishing hook adjacent said point end wherein said point end of said single fishing hook travels from side to side with its motion limited by said toggle plate.

9. A fishing lure according to claim 8, wherein said toggle plate defines upper and lower holes, a screw eye connected adjacent said rear end of said body, said screw eye being connected to said upper hole, said lower hole of said toggle plate receiving said shank of said single fishing hook adjacent the point end.

* * * * *